…

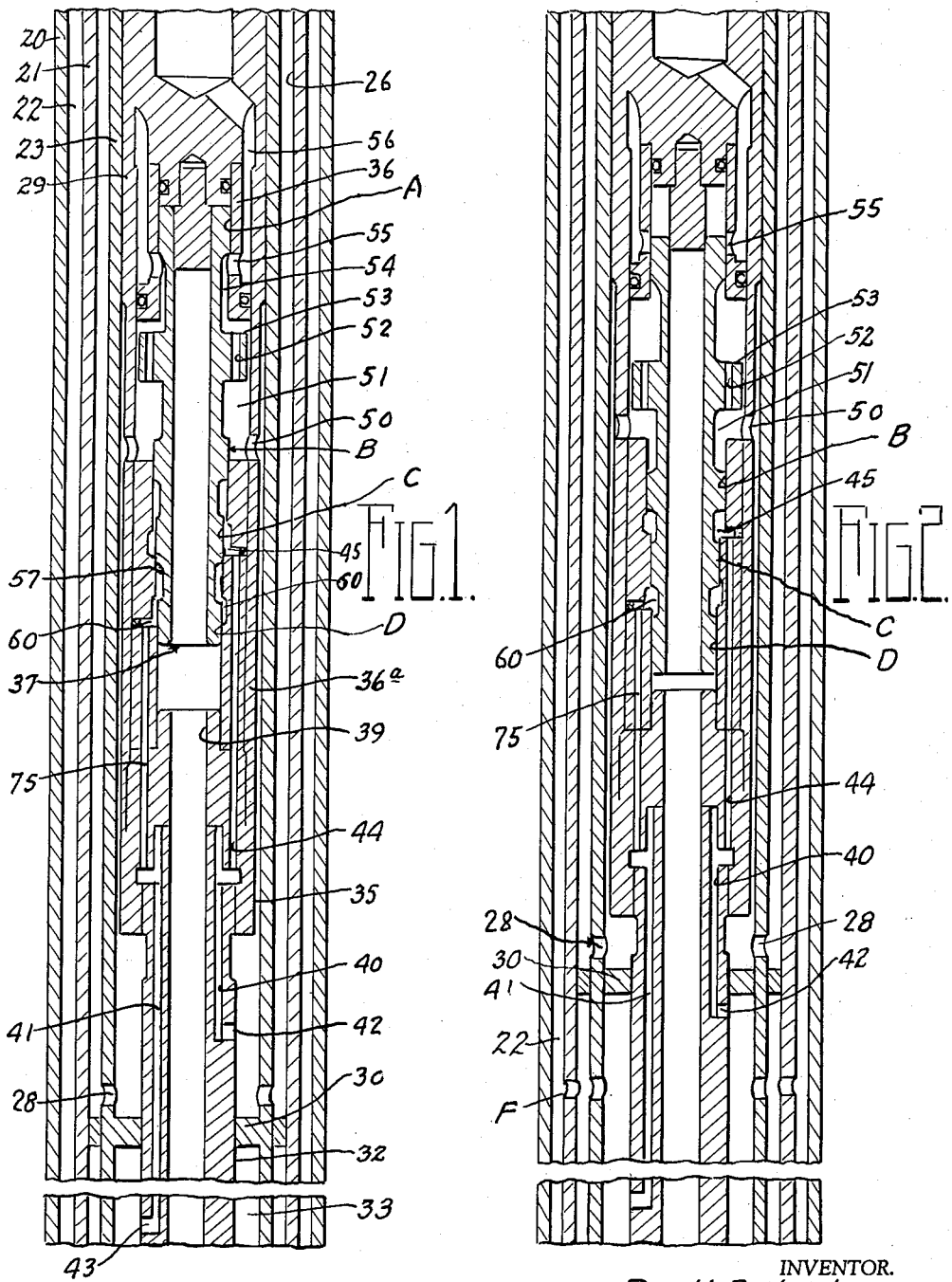

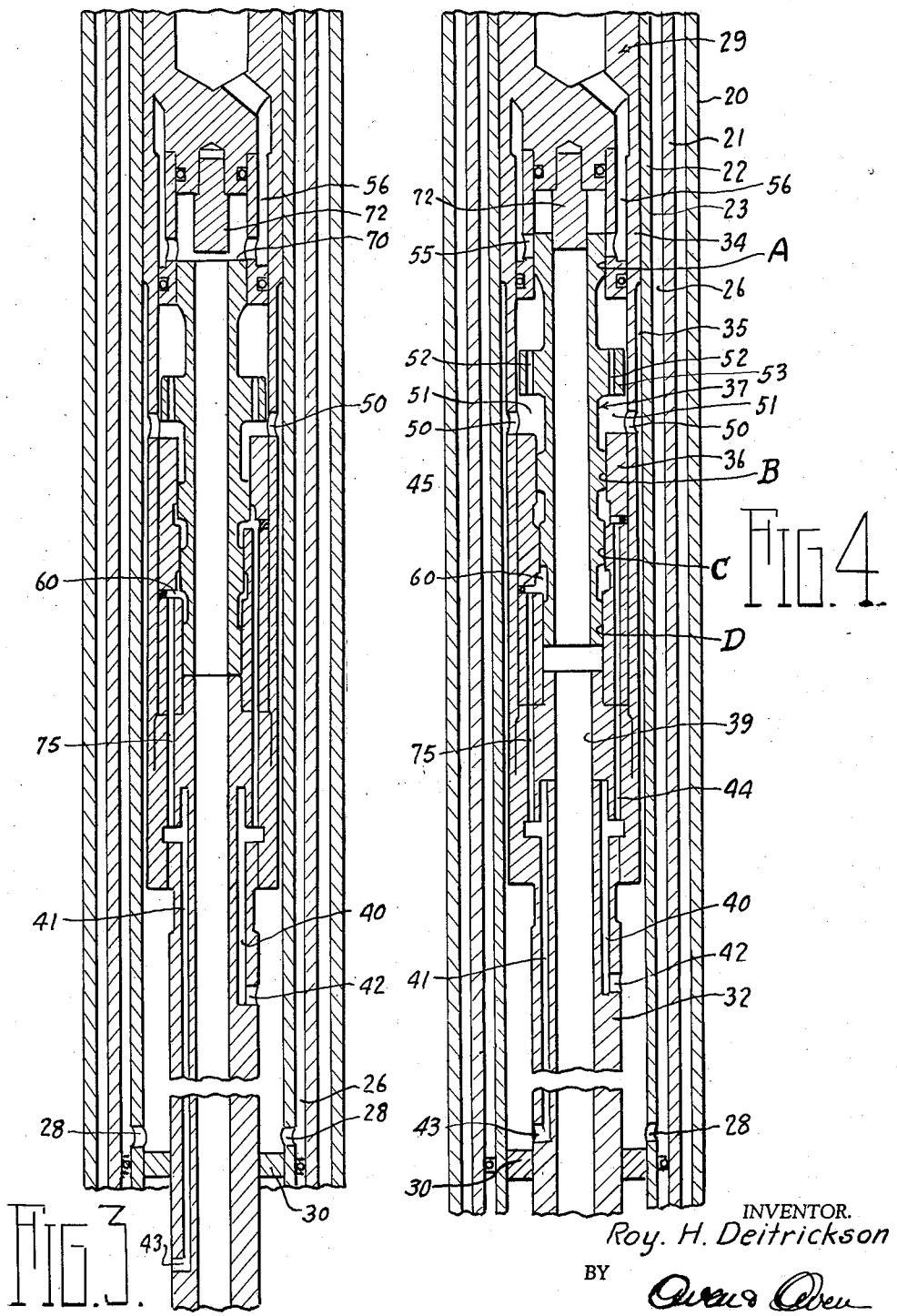

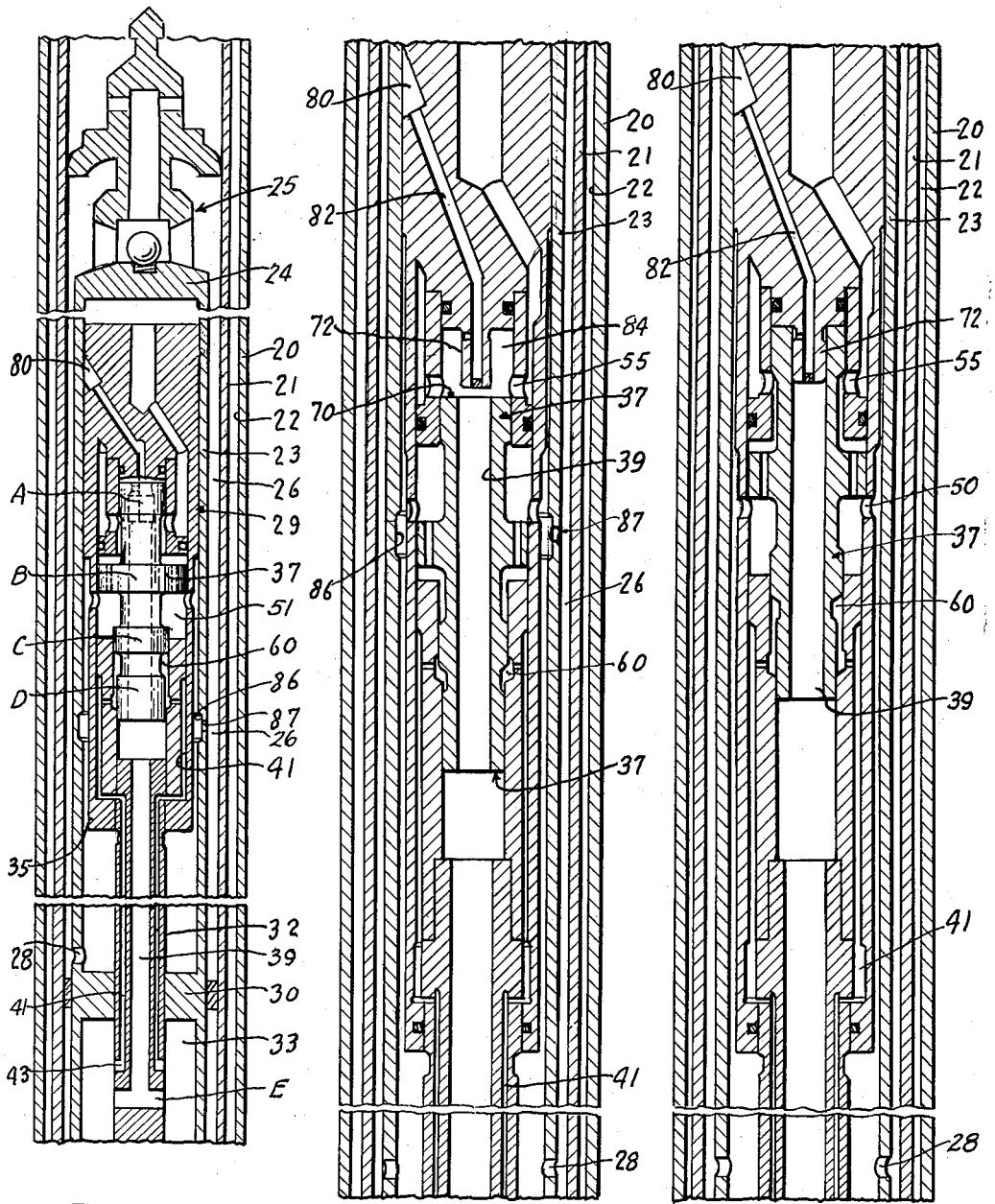

United States Patent Office 2,966,894
Patented Jan. 3, 1961

2,966,894

CONTROL VALVES FOR FLUID ACTUATED PUMPS

Roy H. Deitrickson, Allison Park, Pa., assignor to The National Supply Company, Pittsburgh, Pa., a corporation of Ohio Filed Jan. 26, 1959, Ser. No. 788,982

4 Claims. (Cl. 121—123)

This invention relates to control valves for fluid operated downwell pumps and is particularly directed to a construction in which the control valve for directing fluid to the space above the engine piston, and for discharging fluid from such space, is carried within the piston.

The control valve of the present invention is utilized in a fluid actuated engine of the type having differential area upper and lower faces so that if the smaller face of the engine piston is exposed to high pressure fluid at all times and the other and larger face of the piston is alternately exposed to high pressure and low pressure fluid reversal of movement of the piston will occur.

The primary object of the invention is to provide a control valve for a fluid operated engine for a downwell pump in which substantial reversing force for the valve is available at each end of the stroke of the engine piston for positive reversal of the valve.

Another object of the invention is to provide a control valve for a fluid operated engine for a downwell pump, which valve is held in its attained position by a small differential pressure on one surface of the valve, so that, until reversal is desired at the end of a stroke of the engine piston, the valve is biased slightly against reversal. Except for the small holding force, however, the valve is balanced in its attained position.

Other objects and advantages of the invention will become apparent from the following specification, reference being had to the accompanying drawings, in which:

Fig. 1 is a fragmentary longitudinal cross-sectional view of a hydraulic engine having a reversing valve constructed according to the present invention, with the valve in the down stroke position;

Fig. 2 is a view similar to Fig. 1 with the valve in the position of bottom reversal;

Fig. 3 is a view similar to Fig. 1 with the valve in the upstroke position;

Fig. 4 is a view similar to Fig. 1 with the valve in the position of top reversal;

Fig. 5 is a diagrammatic view in longitudinal cross section, with the valve shown in full lines of a modification of the invention and indicating a typical association of the parts when installed;

Fig. 6 is a fragmentary longitudinal sectional view of the modified form of valve shown in Fig. 5, standing in the upstroke position; and Fig. 7 is a view similar to Fig. 6 with the valve in the down stroke position.

The invention consists of a pressure actuated valve carried within the piston of a fluid operated engine, and reversing its position at the top and bottom of the stroke of the piston in response to a change in pressure on one or more control surfaces formed on the valve, the changes in pressure being brought about by the registration of certain ports with high and low pressure fluid. Thus the valve is of the type that undergoes a powered reversal at each end of the stroke of the engine piston.

When in one position, the valve serves to connect the engine cylinder above the piston with a source of high pressure operating fluid, while in its second position the valve serves to connect this same cylinder space with a lower, or discharge pressure.

In accordance with one modification of the invention the ports which cause the admission of fluid for the purpose of operating the valve are disposed in the piston rod, while in another modification of the invention at least one of the ports is formed in the periphery of the piston itself.

As used in the following specification and in the claims, the term "hydraulic force" covers the summation of hydraulic forces acting at any given time in any one direction. The hydraulic force can be created in either of two ways: first, by exposing equal areas to different and oppositely acting pressures; secondly, by exposing different areas to the same pressure. It should also be noted that, as used in the following specification, the terms "up" and "down" and other forms thereof such as "upwardly," "downwardly," "upstroke" and "down stroke" relate to the orientation of the embodiments described and are not limitations either upon the positions of the parts in other embodiments of the invention or to be interpreted as limiting the invention to such positions or directions.

*Engine construction*

A control valve embodying the invention is intended to be employed with a fluid actuated engine for a downwell pump of the general type that is located at or near the bottom of a well casing fragmentarily indicated in the figures by the reference numeral 20. The casing 20 contains tubing 21 in the usual manner and an annulus 22 between these two conduits may be used for any desired purpose. In illustrating the engine of the downwell pump it will be assumed that the pump itself is of the type well known in the art which discharges its production fluid into a separate string of tubing.

The engine for a downwell pump of this general type has an engine cylinder 23 which carries at its top a fitting 24, including a valve assembly 25 by which power fluid may be taken from the tubing 21 if the pump is of the "free" type. This arrangement is well known in the art. The engine cylinder 23 is spaced from the interior of the tubing 21 to provide a power fluid annulus 26 which is filled at all times with power oil supplied from the surface through the fitting 24 and valve 25. The annulus 26 is connected through ports 28 at the lower end of the engine cylinder to the interior of the cylinder beneath the engine piston which is designated generally 29.

Below the engine cylinder is a stuffing box 30 through which pump piston rod 32 extends to connect the engine and pump pistons in the usual manner. The pump piston is not shown in the drawings. The stuffing box 30 separates the engine cylinder, which contains high pressure oil, from a space 33 which represents the power oil discharge space and thus contains low pressure oil. The space 33 may, if desired, be connected with the production fluid annulus 22 through a port F (Fig. 2).

Within the engine cylinder 23 the engine piston 29 is operated by means of the power fluid supplied from the surface. The piston comprises a close fitting section 34 and a portion of smaller diameter therebelow which is designated 35 in the drawings and which contains the valve parts hereafter described.

Within the piston, a two part valve jacket 36, 36a is provided which is formed to cooperate with a spool-type valve the body of which is designated 37. The jacket itself is formed in two parts only for ease of assembly and manufacture and each part is drilled with the various supply and exhaust passages hereafter described.

The spool valve 37 is a hollow cylindrical member guided by its various lands for reciprocation within the jacket 36. During the down stroke, the valve stands in an upper position, and during the upstroke of the piston 29 the valve stands in a lower position. The periphery of the valve is stepped to provide close fitting lands, A, B, C and D which serve to separate fluids at various pressures from each other, and to provide differential area shoulders against which pressures can act to move the valve from one position to the other. A differential area shoulder occurs between lands of the valve and represents a step in diameter. Thus, a chamber formed by such lands or shoulders may have, for example, an area greater by .040 square inch on one side than on the other. If such a chamber is filled with oil at 2000 p.s.i., a force of 80 pounds will be set up tending to move the valve in the direction of the larger area land or shoulder.

The engine piston 29 is, as above stated, connected to a pump piston (not shown) by piston rod 32 which is hollow and thus provides a central discharge passage 39. The passage 39 connects to a main discharge port which is at all times below the stuffing box 30 and is diagrammatically indicated at E in Fig. 5.

In one form of the present invention, the piston rod 32 is provided with two other, separate longitudinal passages 40 and 41 which terminate in spaced lateral rod ports 42 and 43 respectively. The rod ports 42 and 43 carry valve-actuating fluid as hereinafter described, with the upper rod port 42 normally in register with the high pressure power oil contained in the engine cylinder above the stuffing box, while the lower rod port 43 is normally in register with the lower discharge pressure below the stuffing box. As will be more fully described hereinafter, each of the rod ports 42 and 43 moves temporarily beyond the stuffing box at the end of the stroke of the engine piston with the result that the pressure conditions in the passages 40 and 41 change abruptly.

Down stroke

Figure 1 of the drawings shows the valve in the position occupied while the engine piston is making a down stroke. In this position fluid is being supplied from the power fluid annulus 26 to the lower end of the engine cylinder, up around the smaller diameter piston portion 35, through a main supply port 50 in the side wall of the piston to a chamber 51 in the valve jacket 36a, through a passage 52 in a flange 53 formed on the valve body 37 which somewhat restricts the flow, through an annular passage 54 formed as a reduced diameter of the valve body below land A, and a port 55 which extends radially outward through the valve jacket 36. This latter port registers with an upwardly extending passage 56 which communicates with the cylinder space above the engine piston. Since the top of the engine piston has a greater effective area than the lower side thereof, due to the presence of the piston rod, the piston will move downwardly if the pressure times the area of the upper face is greater than the pressure times the area of the lower face.

During the down stroke of the piston the upper rod port 42 in the wall of the piston rod 32 is above the stuffing box 30 and is thus exposed to power oil in the lower portion of the engine cylinder. Thus high pressure oil passes through passages 40 and 44 to an annular chamber 45 in the valve body 37 which balances the valve when standing in the upper position since the high pressures on the annular area at each side of the land B between the annular chamber 45 and the chamber 51 above the land B are the same.

Below the chamber 45 the valve body is stepped to a smaller diameter so that the valve body land C is larger in area than valve body land D. The chamber between lands C and D is designated 57 and during the down stroke contains fluid at low pressure since this chamber is connected to rod passage 41 which communicates with the lower rod port 43.

The valve is slightly biased to stand in its upper position as indicated in Fig. 1 by the pressure drop through passage 52, the pressure being higher in chamber 51 than in the space above the flange 53 at the outlet of passage 52.

Bottom reversal

The down stroke of the engine piston continues until the upper rod port 42 passes through the stuffing box 30. At this time the high pressure oil which has previously been exerting its force in passages 40 and 44 and on the valve body at the lower shoulder of land B drops to the pressure of the exhaust which is much lower than the power oil pressure. Thus the pressure on the upper shoulder of the land B, in chamber 51 predominates and forces the valve rather rapidly to its reversed position. This bottom reversal is shown in Fig. 2 and is caused, as above stated, by the predominance of the pressure on the upper shoulder of land B over the pressure on the shoulder thereof.

The valve having shifted to its reversed position has closed communication between supply passage 50 and the upper cylinder inlet port 55. Thus power oil no longer flows from the power oil supply to the top of the engine piston. The valve continues to move downwardly until it attains the position shown in Fig. 3 which it occupies during the upstroke.

Upstroke

During the upstroke of the engine piston 29, which is caused by the pressure on the lower face of the piston predominating over the pressure on the upper face, the cylinder space above the piston is connected to exhaust through passage 56, port 55 and flow through this port passes across the nose of the valve body which is designated 70 in Fig. 3 and into the hollow interior of the valve body where the fluid passes downwardly through the rod in the interior passage 39 and outwardly through the main exhaust port E either to mingle with the production fluid from the pump driven by the engine or to be collected in a separate string leading to the surface in a manner well known in the art. During the upstroke the valve is again balanced since the upper rod port 42 has pulled up out of the stuffing box 30 and again communicates with the high pressure oil in the lower portion of the engine cylinder. Thus high pressure reappears in chamber 45, eliminating the pressure difference which caused the valve to reverse, and again balancing the valve.

It will be noted that there is a restriction to the flow of oil from the upper portion of the engine cylinder through port 55 by reason of the constriction in the path caused by the nose of the valve 70 cooperating with a stationary element 72. This pressure drop thus results in a force acting downwardly on the valve body which is quite small but nonetheless effective to hold the valve in its lowered position during the entire upstroke. Obviously, the pressure drop can be increased by decreasing the space available for the passage of oil across nose 70. This "detent" effect of the pressure drop at this point continues until the motion of the piston reaches the top of the stroke where it is arrested in the conventional manner. With the piston stopped, the pressure drop disappears by reason of the fact that the flow of oil has ceased. The valve is then ready to make a reversal at the top of the stroke.

Top reversal

The top reversal occurs when the lowermost rod port 43 is pulled above the stuffing box 30 as indicated in Fig. 4. When this occurs high pressure oil appears in the rod passage 41 and is communicated through a passage 75 in the jacket to the annular space or chamber 60 formed below land C at the lower portion of the valve body. At this time, then, the force acting upwardly on the valve comprises the force in chamber 60, the upper area of which is greater than the lower area by the difference in diameters between lands C and D, added to the force in chamber 51. This force is derived from the difference in area between land A and land B of the valve body, since the effective area of the top of chamber 51 is greater than the effective area of the lower portion of the chamber, a force upwardly on the valve occurs at this point.

The valve is thus forced, by the difference in pressures, to move upwardly to cause the top reversal. When the valve moves upwardly far enough it closes communication between the cylinder supply port 55 and the interior of the valve by overrunning the stationary element 72 and, shortly thereafter opens port 55 to power oil from the supply port 50. This results in the engine piston making a down stroke as above described.

It will thus be seen that there occurs, at each end of the stroke of the piston, a powered reversal of the valve by reason of the exposure of the rod ports 42 and 43 to high and low pressure. The upper rod port 42 is normally exposed to high pressure in the lower end of the engine cylinder and continues so connected until it passes through the stuffing box 30 and connects to low pressure. When this occurs the pressure in chamber 45 drops, causing the valve to move to the lower position. The top reversal of the valve is caused by the lower rod port 43 which is normally exposed to the exhaust pressure existing below the stuffing box, to the high pressure existing above it when the piston has pulled the rod upwardly far enough so that the port 43 moves above the stuffing box 30 and high pressure oil enters from the lower end of the engine cylinder through the second rod passage 41 to fill chamber 60. When this occurs the valve is powered or forced to move from its lower to its upper position.

It will be seen that the valve body is essentially balanced in each of its two operating positions, but that a small holding force exists tending to retain it in its attained position. In the first position in which the top of the engine cylinder is connected to the source of power fluid (port 50 open), the holding force is derived from the pressure drop through passage 52 and around flange 53 and acts upwardly. In the second position in which the top of the engine cylinder is connected to exhaust, the small holding force is derived from the pressure drop across the nose 70 of the valve body of the fluid flowing from the cylinder to the exhaust passage, and the force acts downwardly on the valve body. In each instance however, the force which reverses the position of the valve body is a positive force acting contra to the holding force and caused by a change in pressure on the spool from one or the other of the rod passages 40 and 41.

*Modification*

A modification of the invention is shown in Figures 5 to 7. Structurally this modification eliminates the rod passage 40 and its port 42 which are used to cause the bottom reversal of the valve in the form previously described, and substitutes therefor a different means to impose a pressure on the spool to accomplish this movement of the valve. With the elimination of the passage 40, and the chamber 45 in which it terminates, the valve spool itself can be made with one less land.

In this form of the invention, the upper portion of the engine piston 29, which fits closely against the cylinder wall, is formed with a side port 80 normally closed by engagement with the wall of the cylinder. This port opens into a passage 82 which extends centrally of the piston to a space 84 over the top of the valve body 37. A groove 86 is formed in the wall of the cylinder 23 near its lower end, and is constantly filled with power oil at high pressure either from the lower portion of the cylinder, or through a separate port 87 in the wall of the cylinder opening into the power fluid annulus 26.

When the piston side port 80 registers with the groove 86, oil at full power oil pressure enters the space 84 above the valve body 37, forcing it downwardly to open the port 55 to exhaust through the interior of the valve body 37. This accomplishes the bottom reversal of the engine piston. The force on the top of the valve continues until the body has cleared the stationary element 72 around which the valve body stands during the down stroke.

With the valve body 37 forced downwardly, the upper cylinder port 55 is opened to exhaust and the upstroke of the engine piston begins. The valve body 37 is again essentially balanced, but there is a slight force biasing the valve to stand in its lowered position, again by reason of the drop in pressure across the nose 70 of the valve body by reason of the flow from the top of the cylinder to exhaust. The upstroke continues until the lower rod port 43 emerges from the stuffing box 30 in the upward direction so that high pressure oil can enter passage 41 and chamber 60. Thus the forces involved in making the top reversal of the valve are the same as in the form of the invention previously described.

While the invention has been described in conjunction with two modifications thereof, various other modifications and changes will suggest themselves to those skilled in the art, and it should be expressly understood that such modifications and changes may be made without departing from the invention as defined in the appended claims.

What I claim is:

1. In a hydraulic engine having a cylinder, a source of power fluid, means forming a discharge passage, and a piston slidable in said cylinder, a reversing valve comprising in combination, a slidable cylindrical valve body, a passageway controlled by said valve body and open when said valve body is in a first position for connecting one end of said cylinder to said source, said valve body when in a second position closing said passageway, means in said passageway between said source and end of said cylinder forming a flow restriction therein, means responsive to a pressure drop across said restriction for holding said valve body in said first position with said passageway open, a second passageway controlled by said valve body and open when said valve body is in such second position for connecting said end of said cylinder to said discharge, and means operable at each end of each stroke of said piston to impose a pressure from said source on said valve body to move said valve body to a reversed position.

2. The combination of elements defined in claim 1 and a second restriction in said passageway between said end of said cylinder and discharge passage for holding said valve body in the second position.

3. In a hydraulic engine having a cylinder, a source of power fluid, means forming a discharge passage, and a piston slidable in said cylinder, a reversing valve comprising, in combination, a slidable cylindrical valve body, a passageway controlled by said valve body and open when said valve body is in a first position for connecting one end of said cylinder to said discharge, means in said passageway forming a flow restriction therein, means responsive to pressure drop across said restriction for holding said valve body in said first position with said passageway open, and a second passageway controlled by said valve body and open when said valve body is in such second position for connecting said end of said cylinder to said source.

4. In a hydraulic engine having a cylinder, a source of power fluid, means forming a discharge passageway, and a piston slidable in said cylinder, a reversing valve having two opposite operative positions in one of which one end of said cylinder is connected to said source and in the other of which said end of said cylinder is connected to said discharge, means for establishing a hydraulic biasing force urging said valve to stand in its attained position during each operative stroke of said piston, and means including ports opened and closed by movement of said piston to impose a moving hydraulic force on said valve at the end of each stroke of said piston in each direction acting contra to said hydraulic biasing force to move said valve to the opposite position when said piston attains a predetermined travel in each direction.

References Cited in the file of this patent

UNITED STATES PATENTS

| | | |
|---|---|---|
| 1,907,951 | Gage | May 9, 1933 |
| 2,682,257 | Deitrickson | June 29, 1954 |
| 2,851,013 | Doughton | Sept. 9, 1958 |
| 2,870,749 | Deitrickson | Jan. 27, 1959 |